United States Patent
Liu et al.

(10) Patent No.: US 9,438,820 B1
(45) Date of Patent: Sep. 6, 2016

(54) SYSTEMS AND METHODS FOR PROCESSING COMPOSITE VIDEO SIGNALS

(71) Applicant: Marvell International Ltd., Hamilton (BM)

(72) Inventors: Yichen Liu, Shanghai (CN); Hongyu Zhang, Shanghai (CN); Wei Zheng, Shanghai (CN); Yanwei Ji, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/613,638

(22) Filed: Feb. 4, 2015

Related U.S. Application Data

(60) Provisional application No. 61/935,600, filed on Feb. 4, 2014.

(51) Int. Cl.
*H04L 7/00* (2006.01)
*H04N 5/265* (2006.01)
*H04N 5/04* (2006.01)

(52) U.S. Cl.
CPC ............. *H04N 5/265* (2013.01); *H04N 5/04* (2013.01)

(58) Field of Classification Search
CPC .......... H04N 5/265; H04N 5/04; H04N 7/00; H04N 7/01

USPC .................................. 348/536, 537, 521, 525
IPC .......................................................... H04L 7/00
See application file for complete search history.

(56) References Cited

U.S. PATENT DOCUMENTS

| | | | | |
|---|---|---|---|---|
| 7,355,652 B2 * | 4/2008 | Gudmondson | ........... | H03L 7/06 348/441 |
| 7,359,007 B2 * | 4/2008 | Wu | ........... | G06T 3/40 348/441 |
| 7,671,924 B2 * | 3/2010 | Chao | ........... | G09G 5/005 348/441 |
| 8,587,722 B1 * | 11/2013 | Jiang | ........... | H04N 5/126 348/521 |

* cited by examiner

*Primary Examiner* — Trang U Tran

(57) ABSTRACT

System and methods are provided for processing composite video signals. The system includes: a clock synthesizer configured to generate a line lock clock signal; an interpolation unit configured to generate source data associated with a source composite video signal, the source composite video signal being related to a source clock signal; a buffer unit configured to store the source data based at least in part on the source clock signal and provide destination data based at least in part on the line lock clock signal; a signal processing unit configured to process the destination data to extract a synchronization component and determine a phase error between the synchronization component and the line lock clock signal. The clock synthesizer is further configured to adjust the line lock clock signal based at least in part on the phase error.

20 Claims, 7 Drawing Sheets

SYSTEMS AND METHODS FOR PROCESSING COMPOSITE VIDEO SIGNALS

CROSS-REFERENCE TO RELATED APPLICATIONS

This disclosure claims priority to and benefit from U.S. Provisional Patent Application No. 61/935,600, filed on Feb. 4, 2014, the entirety of which is incorporated herein by reference.

FIELD

The technology described in this patent document relates generally to signal processing and more particularly to processing video signals.

BACKGROUND

Composite video signals are widely used for multimedia devices, such as analog TV systems, DVD systems, etc. A composite video signal often combines on one wire video information needed to recreate a color picture, as well as line and frame synchronization pulses. For example, a Composite Video Broadcasting Signal (CVBS) includes a luminance component, one or more chrominance components, one or more horizontal synchronization (hSync) pulses and one or more vertical synchronization (vSync) pulses.

As shown in FIG. 1, an analog intermediate-frequency (IF) signal 102 is converted by a demodulator 104 to a CVBS 106 and an audio signal (not shown), where a CVBS decoder 110 processes the CVBS 106. Usually, the hSync pulses in the CVBS 106 can be used to generate a line lock clock which is used as a work clock for the CVBS decoder 110. The usage of the line lock clock may ensure that the quantity of sampling points at each line are the same so that luminance (Y) and chrominance (C) components of the CVBS 106 can be separated through subsequent filtering (e.g., using 2D and 3D comb filters).

SUMMARY

In accordance with the teachings described herein, system and methods are provided for processing composite video signals. The system includes: a clock synthesizer configured to generate a line lock clock signal; an interpolation unit configured to generate source data associated with a source composite video signal, the source composite video signal being related to a source clock signal; a buffer unit configured to store the source data based at least in part on the source clock signal and provide destination data based at least in part on the line lock clock signal; a signal processing unit configured to process the destination data to extract a synchronization component and determine a phase error between the synchronization component and the line lock clock signal. The clock synthesizer is further configured to adjust the line lock clock signal based at least in part on the phase error. The interpolation unit is further configured to adjust the source data based at least in part on the phase error.

In one embodiment, a method is provided for processing composite video signals. A line lock clock signal is generated. Source data associated with a source composite video signal is generated. The source composite video signal is related to a source clock signal. The source data is stored in a buffer based at least in part on the source clock signal. Destination data is provided from the buffer based at least in part on the line lock clock signal. The destination data is processed to extract a synchronization component. A phase error between the synchronization component and the line lock clock signal is determined. The line lock clock signal is adjusted based at least in part on the phase error. The source data is adjusted based at least in part on the phase error.

In another embodiment, a system for processing composite video signals includes: a computer-readable medium, and one or more data processors. The computer-readable medium is encoded with instructions for commanding the data processors to execute certain operations. A line lock clock signal is generated. Source data associated with a source composite video signal is generated. The source composite video signal is related to a source clock signal. The source data is stored in a buffer based at least in part on the source clock signal. Destination data is provided from the buffer based at least in part on the line lock clock signal. The destination data is processed to extract a synchronization component. A phase error between the synchronization component and the line lock clock signal is determined. The line lock clock signal is adjusted based at least in part on the phase error. The source data is adjusted based at least in part on the phase error.

DETAILED DESCRIPTION

Figure 1:
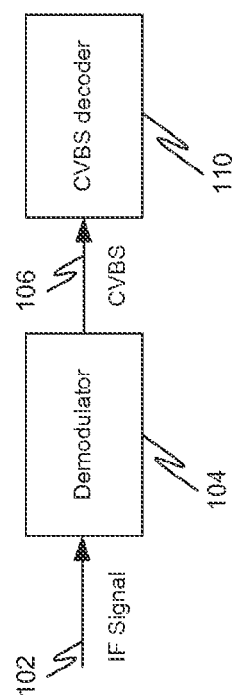
FIG. 1 depicts an example diagram for video signal processing.

Under some circumstances, different clock domains often exist in video signal processing systems. For example, as shown in FIG. 1, the demodulator 104 implements a free-running clock (e.g., a crystal oscillator) which is asynchronous to the line lock clock used by the CVBS decoder 110. Such mismatch of the clock domains may cause severe data distortion and inaccurate separation of luminance and chrominance components of the CVBS, hence resulting in artifacts on TV display.

Figure 2:
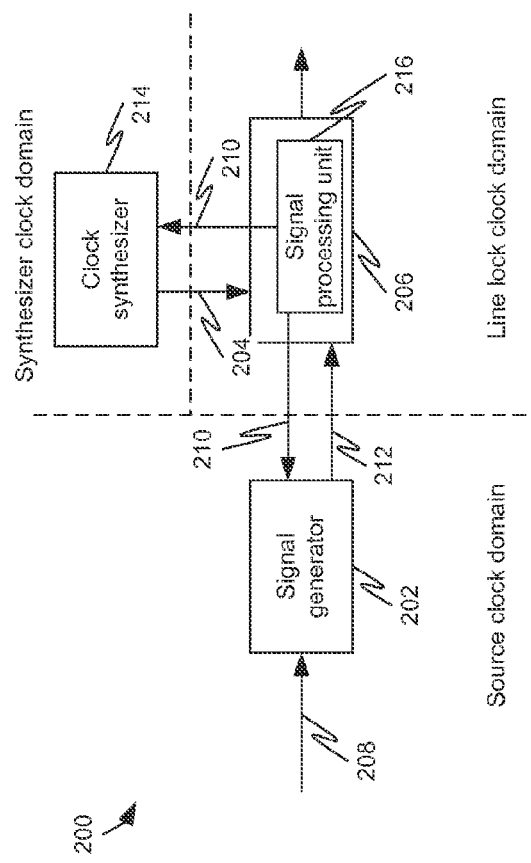
FIG. 2 depicts an example diagram showing a video signal processing system.

FIG. 2 depicts an example diagram showing a video signal processing system. As shown in FIG. 2, the system 200 implements a feedback mechanism to take into account the clock mismatch between a source clock domain and a line lock clock domain for video signal processing.

Specifically, A signal generator 202 which uses a source clock signal (not shown) as its working clock processes a source composite video signal 208 (e.g., a CVBS) and generates output data 212. A synchronization component (e.g., one or more hSync pulses) is embedded in the source composite video signal 208. A decoder 206 decodes the output data 212 using a line lock clock signal 204 generated by a clock synthesizer 214. Further, a signal processing unit 216 included in the decoder 206 extracts the synchronization component from the output data 212 and determines a phase error between the synchronization component and the line lock clock signal 204. In response to a control signal 210 from the signal processing unit 206, the signal generator 202 adjusts the output data, and the clock synthesizer 214 adjusts the line lock clock signal 204 to reduce the phase error between the synchronization component and the line lock signal 204.

In some embodiments, the source composite video signal 208 is generated using the source clock signal. For example, the source clock signal has a frequency $f_{src}$, and the line lock clock signal has a frequency $f_{ll}$, where $f_{src}$ is higher than $f_{ll}$. The clock synthesizer 230 uses a synthesizer clock signal as its working clock, and the synthesizer clock signal is synchronous (e.g., in phase) to the source clock signal. In certain embodiments, the synthesizer clock signal has a frequency $f_{cs}$ which is much higher than the frequency of the line lock clock signal 204, fu.

Figure 3:
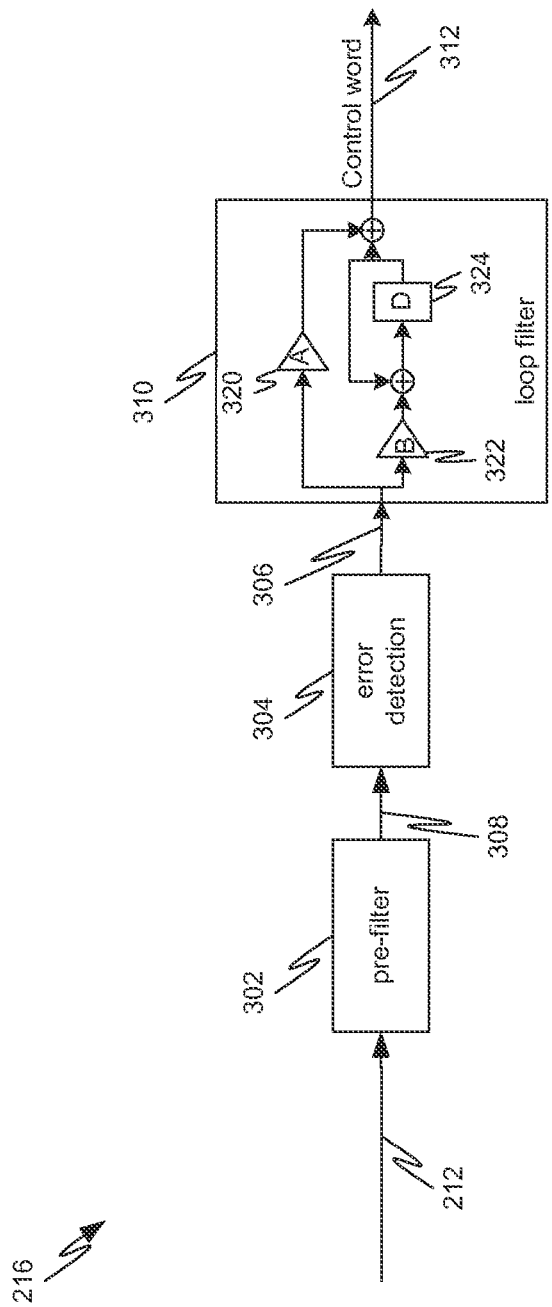
FIG. 3 depicts an example diagram showing a signal processing unit as part of a video signal processing system.

FIG. 3 depicts an example diagram showing the signal processing unit 216. As shown in FIG. 3, within the signal processing unit 216, a pre-filter 302 processes the output data 212. An error detector 304 detects the synchronization component based at least in part on the output data 212 and generates a detection signal 306 indicating the phase error between the synchronization component and the line lock clock signal 204. For example, the synchronization component corresponds to a hSync pulse (e.g., including a falling edge and/or a rising edge) within pre-filtered data 308. The error detector 304 compares the position of the detected hSync pulse (e.g., the falling edge or the rising edge) with a local counter to generate the signal 306. As an example, the pre-filter 302 includes a low pass filter with linear phase responses and removes high-frequency components in the output data 212.

In addition, the signal processing unit 216 includes a loop filter 310 to remove noise in the signal 306 and ensure the stability of the signal processing unit 216. For example, the output 312 of the loop filter 310 includes a control word with multiple bits, and is related to the control signal 210 (as shown in FIG. 2). In some embodiments, the loop filter 310 includes a direct processing module 320 and an integral processing part which includes units 322 and 324. For example, the loop filter 310 includes a typical structure for a second-order phase-locked loop (PLL) filter. The module 320 has a "direct pass" gain A, and the units 322 and 324 form an integrator with a gain B. The loop filter 310 may remove noise/jitter within the signal 306, and enable PLL to lock the signal 306 without a residual phase error in some circumstances.

Figure 4A:
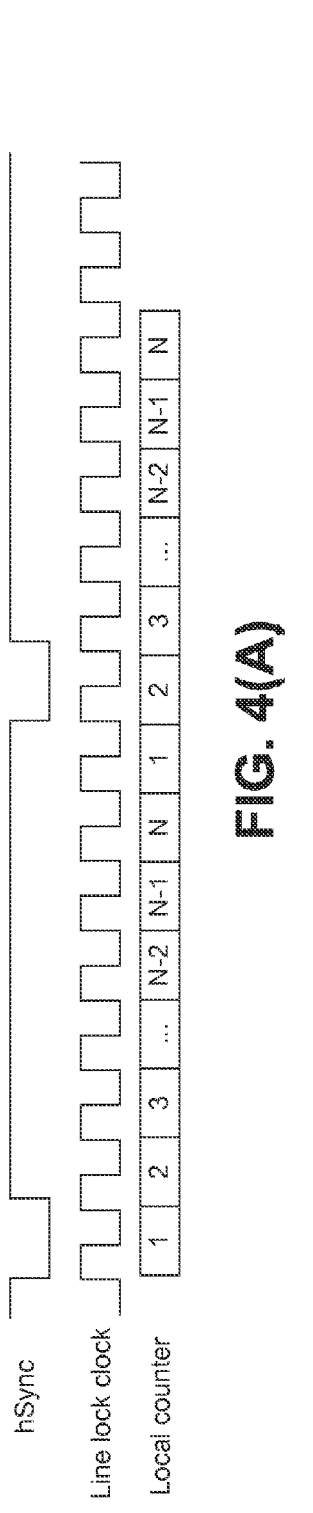
FIG. 4(A)-FIG. 4(C) depict example diagrams showing comparison of hSync pulses with a local counter associated with a line lock clock signal.
Figure 4B:
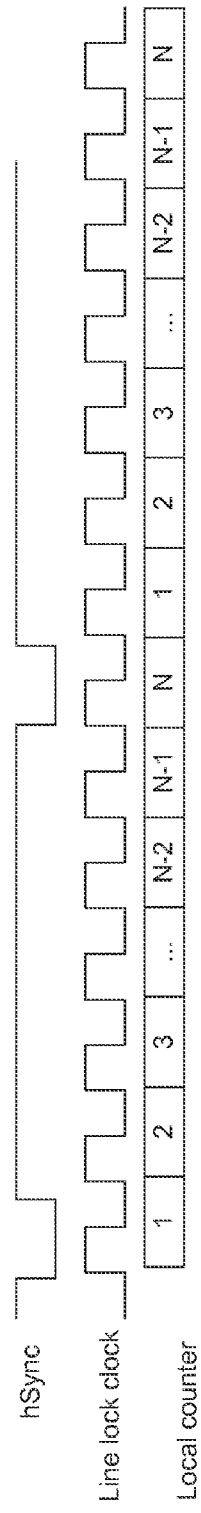
Figure 4C:
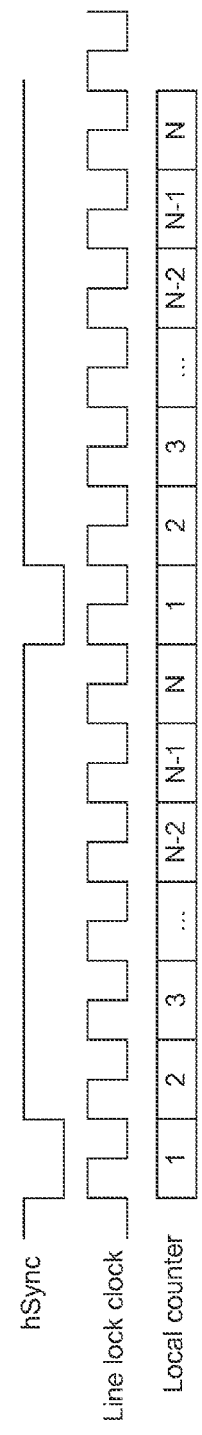

FIG. 4(A)-FIG. 4(C) depict example diagrams showing comparison of hSync pulses with a local counter associated with the line lock clock signal 204. The usage of the line lock clock signal 204 is to ensure that the quantity of sampling points at each line are the same so that luminance (Y) and chrominance (C) components of the CVBS data can be separated through subsequent filtering (e.g., using 2D and 3D comb filters).

For example, N sampling points are needed for each line. If the frequency of the line lock clock signal 204 is higher than needed, then each line which corresponds to a length between two consecutive hSync pulses may include more than N sampling points (e.g., N+1), as shown in FIG. 4(A). The loop filter 310 reduces the control word in the output 312 which is related to the control signal 210 (as shown in FIG. 2) to decrease the frequency of the line lock clock signal 204.

If the frequency of the line lock clock signal 204 is lower than needed, then each line may include less than N sampling points (e.g., N−1), as shown in FIG. 4(B). The loop filter 310 increases the control word in the output 312 to increase the frequency of the line lock clock signal 204. Until the frequency of the line lock clock signal 204 reaches a proper value and each line includes N sampling points, as shown in FIG. 4(C), the signal processing unit 216 continues to operate to adjust the line lock clock signal 204.

Figure 5:
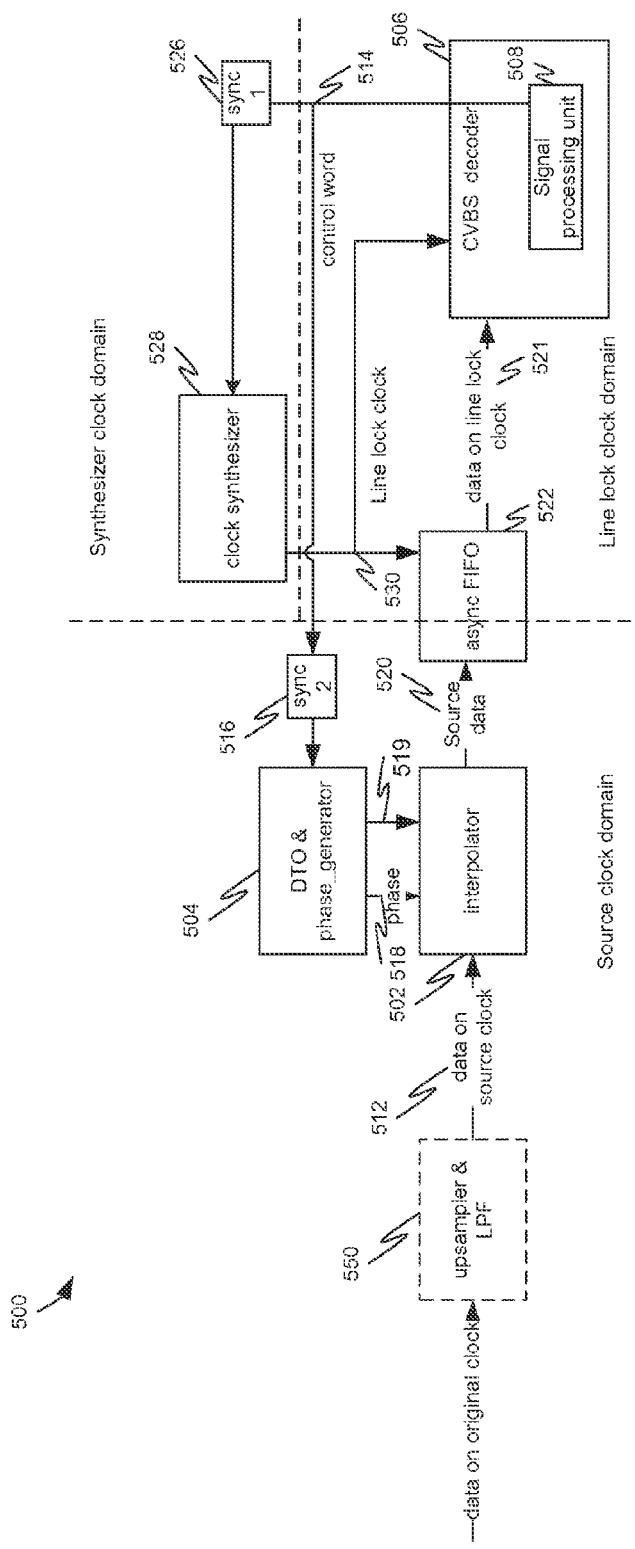
FIG. 5 depicts another example diagram showing a video signal processing system.

FIG. 5 depicts another example diagram showing a video signal processing system. As shown in FIG. 5, the system 500 implements a feedback mechanism to take into account the clock mismatch between a source clock domain and a line lock clock domain for video signal processing. Within the system 500, an interpolator 502 and a phase generator 504 (e.g., a digitally tuned oscillator) use a source clock signal (not shown) as its working clock. A decoder 506 and a signal processing unit 508 use a line lock clock signal 530 as its working clock. In some embodiments, the signal processing unit 508 is not included in the decoder 506.

Specifically, the interpolator 502 generates source data 520 based at least in part on a source composite video signal 512, and the source data 520 is stored to a first-in-first-out (FIFO) buffer 522. Destination data 521 is output from the FIFO buffer 522 to the decoder 506. The signal processing unit 508 extracts a synchronization component from the destination data 521 and determines a phase error between the synchronization component and the line lock clock signal 530. Then, the signal processing unit 508 outputs a control signal 514 (e.g., including a control word) related to the phase error between the synchronization component and the line lock clock signal 530. A synchronizer 516 transmits the control signal 514 to the phase generator 504 which outputs a signal 518 to the interpolator 502.

For example, the phase generator 504 includes an accumulator which increases itself by the value of the control word in the control signal 514 at each source clock cycle. The signal 518 includes phase information associated with the accumulator in the phase generator 504. In addition, the phase generator 504 generates a valid signal 519 to the interpolator 502. In some embodiments, the operations of the phase generator 504 are characterized according to the following equations:

$$\mathrm{cntl}(n+1) = (\mathrm{cntl}(n) + \mathrm{control\_word}(n)) \% (2^N) \qquad (\text{Eq. 1})$$

$$\mathrm{valid}(n+1) = (\mathrm{cntl}(n) + \mathrm{control\_word}(n)) >= (2^N) \qquad (\text{Eq. 2})$$

where cntl represents an unsigned number with a bit-width N related to the accumulator in the phase generator 504, control_word represents the control word in the control signal 514, and valid represents a value of the valid signal 519 generated by the phase generator 504.

The interpolator 502 generates the source data 520 in response to the signal 518 and sends the source data 520 together with the valid signal 519 to the FIFO buffer 522. In some embodiments, the interpolator 502 includes a time-dependent finite impulse response (FIR) filter. The calculation of coefficients related to the interpolator 502 may be based on a polynomial interpolation method (e.g., a cubic or piecewise parabolic interpolation), or based on a poly-phase structure from a prototype low-pass filter. For example, the interpolator 502 calculates data related to the source data 520 when the valid signal 519 is at a logic high level. In certain embodiments, the interpolator 502 is implemented as a pipeline. The valid signal 519 is delayed to align with the calculated data related to the source data 520. The delayed valid signal and the source data 520 are sent to the FIFO buffer 522.

The FIFO buffer 522 includes a write clock and a readout clock. For example, the write clock is synchronous to the source clock signal, and data is written from the interpolator 502 to the FIFO buffer 522 when the valid signal 519 is at the logic high level. The readout clock is synchronous to the line lock clock signal 530. In some embodiments, the FIFO buffer 522 has sufficient depth to handle jitter or delay between the valid signal and the line lock clock signal 530. The readout operation of the FIFO buffer 522 begins at a proper start point, for example, when the quantity of stored source data in the FIFO buffer 522 reaches a threshold (e.g., half the depth of the FIFO buffer 522), and the destination data 521 is output using the readout clock. The decoder 506 decodes the destination data 521, for example, and generates Y/Cb/Cr components for display.

Another synchronizer 526 transmits the control signal 514 to a clock synthesizer 528 which generates and adjusts the line lock clock signal 530. The clock synthesizer 528 uses a synthesizer clock signal (not shown) as its working clock. For example, the synthesizer clock signal is synchronous to the source clock signal, and the synthesizer clock domain is merged with the source clock domain.

The clock synthesizer 528 includes an accumulator with a working frequency much higher than the frequency of the line lock clock signal 530. The accumulator of the clock synthesizer 528 increases itself by the value of the control word in the control signal 514 in each synthesizer clock cycle, and the line lock clock signal 530 is generated by an overflow signal of the accumulator. In some embodiments, if a smoothing phase-locked loop (PLL) is used by the decoder 506 as an input ADC clock, the smoothing PLL may be used for reducing jitter of the line lock clock signal 530.

The clock synthesizer 528 may be implemented in analog, digital or mixed-signal circuits. In certain embodiments, if the frequency of the source clock signal is not higher than the frequency of the line lock clock signal 530, an up-sampling unit 550 (e.g., including a low-pass filter) may be implemented to convert data from the original clock domain to a source clock domain with higher working frequency for subsequent processing.

Figure 6:
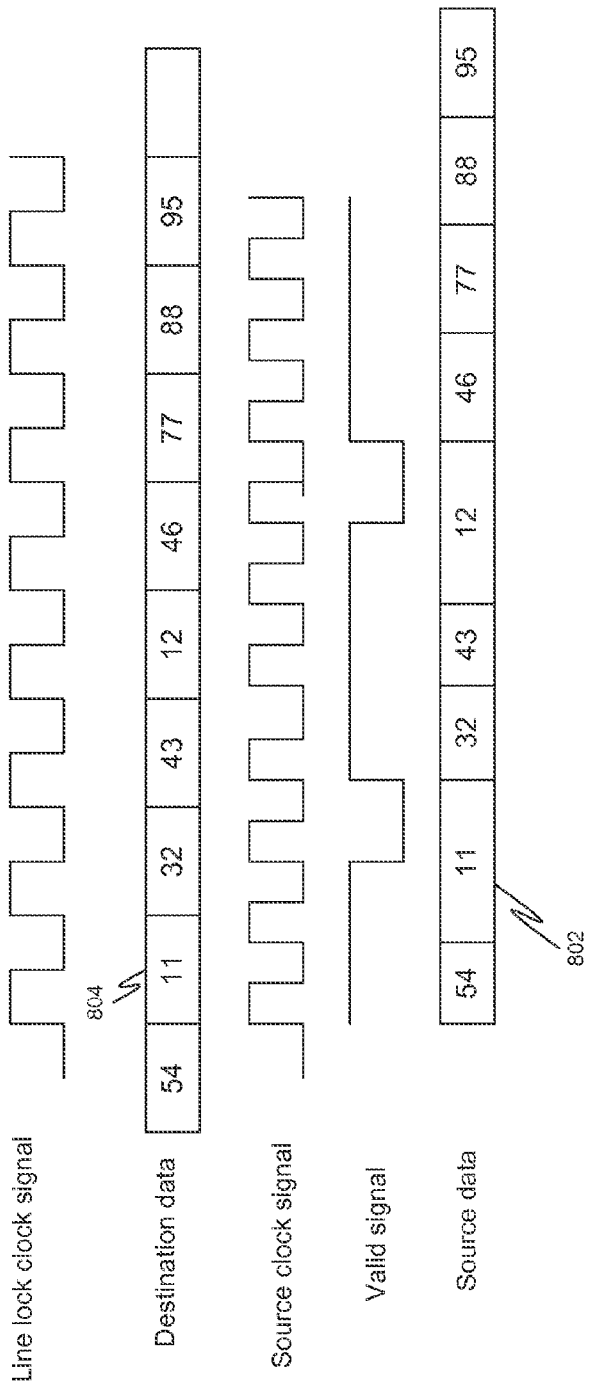
FIG. 6 depicts an example diagram showing different signals of the system as shown in FIG. 5.

FIG. 6 depicts an example diagram showing different signals of the system 500. As shown in FIG. 6, the destination data 521 which is output from the buffer 522 using the line lock clock signal 530 corresponds to different time sequences than the source data 520 which is output from the interpolator 502 using the source clock signal. Further, the source data 520 is stored to the buffer 522 when the valid signal 519 is at the logic high level. For example, part of a data block 802 in the source data 520 is not written into the buffer 522 when the valid signal 519 is at a logic low level. Thus, the corresponding data block 804 in the destination data 521 becomes shorter than the data block 802.

Figure 7:
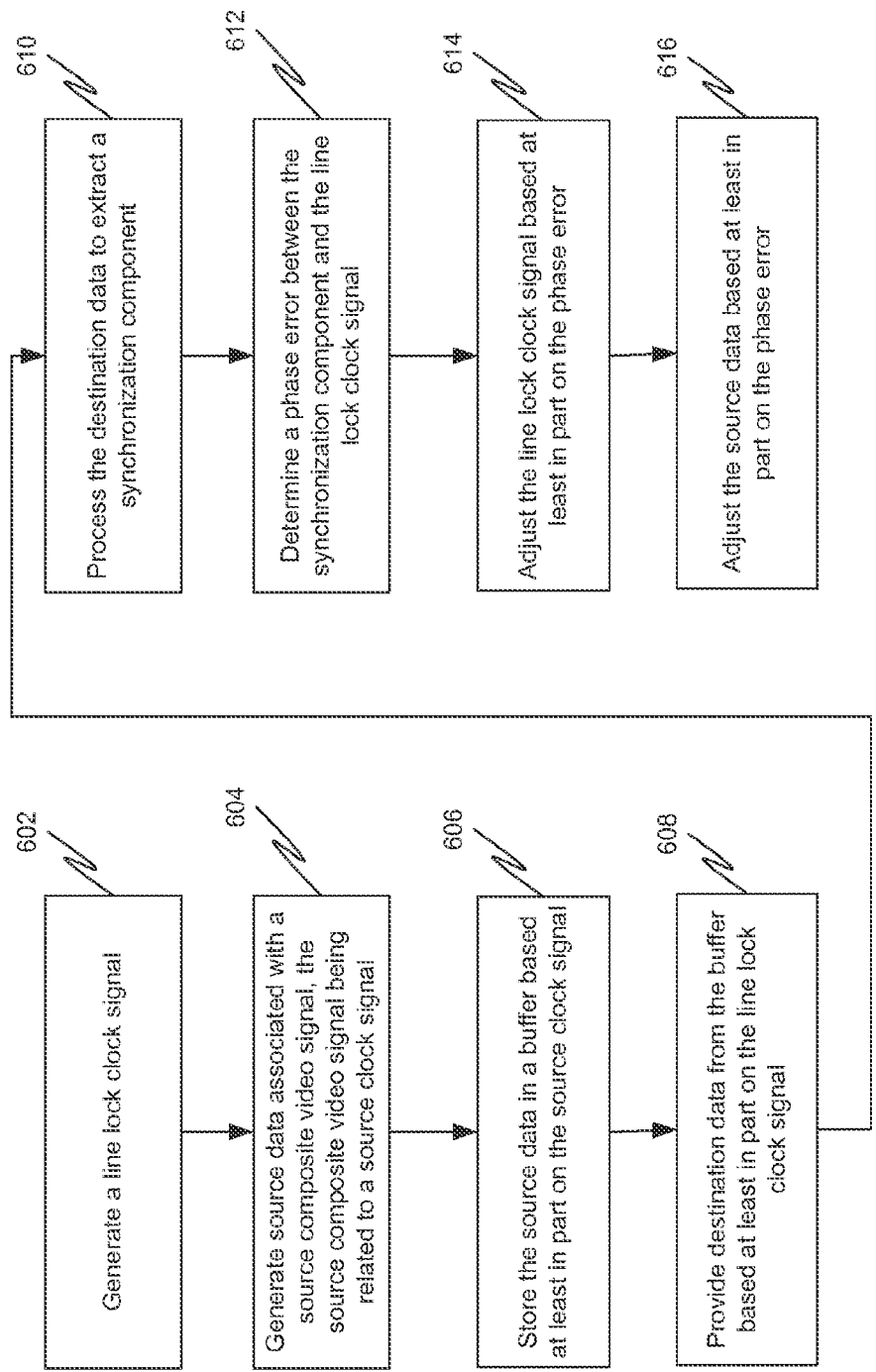
FIG. 7 depicts an example flow chart for processing composite video signals.

FIG. 7 depicts an example flow chart for processing composite video signals. At 602, a line lock clock signal is generated. At 604, source data associated with a source composite video signal is generated. The source composite video signal is related to a source clock signal. At 606, the source data is stored in a buffer based at least in part on the source clock signal. At 608, destination data is provided from the buffer based at least in part on the line lock clock signal. At 610, the destination data is processed to extract a synchronization component. At 612, a phase error between the synchronization component and the line lock clock signal is determined. At 614, the line lock clock signal is adjusted based at least in part on the phase error. At 616, the source data is adjusted based at least in part on the phase error.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A system for processing composite video signals, the system comprising:
   a clock synthesizer configured to generate a line lock clock signal;
   an interpolation unit configured to generate source data associated with a source composite video signal, the source composite video signal being related to a source clock signal;
   a buffer unit configured to store the source data based at least in part on the source clock signal and provide destination data based at least in part on the line lock clock signal;
   a signal processing unit configured to process the destination data to extract a synchronization component and determine a phase error between the synchronization component and the line lock clock signal;
   the clock synthesizer being further configured to adjust the line lock clock signal based at least in part on the phase error, and
   the interpolation unit being further configured to adjust the source data based at least in part on the phase error.

2. The system of claim 1, wherein:
   the signal processing unit includes: a loop filter configured to generate a control signal based at least in part on the phase error, and
   the clock synthesizer is further configured to adjust the line lock clock signal based at least in part on the control signal.

3. The system of claim 1, further comprising:
   a phase-information generator configured to provide phase information to the interpolation unit;
   wherein the interpolation unit is further configured to generate the source data by interpolating the source composite video signal based at least in part on the phase information.

4. The system of claim 3, wherein:
   the phase-information generator is further configured to provide a valid signal to the interpolation unit;
   wherein the buffer unit is further configured to store the source data when the valid signal is at a logic high level.

5. The system of claim 4, wherein:
   the signal processing unit includes: a loop filter configured to generate a control signal based at least in part on the phase error, and the phase-information generator is further configured to adjust the phase information and the valid signal based at least in part on the control signal.

6. The system of claim 1, wherein the clock synthesizer is further configured to adjust the line lock clock signal to reduce the phase error between the synchronization component and the line lock clock signal.

7. The system of claim 1, wherein the buffer unit is further configured to output the destination data when the stored source data reaches a threshold.

8. The system of claim 1, wherein the interpolation unit includes a time-dependent finite impulse response filter.

9. The system of claim 1, wherein the signal processing unit includes:
an error detector configured to extract the synchronization component and determine the phase error between the synchronization component and the line lock clock signal.

10. The system of claim 9, wherein the synchronization component corresponds to one or more pulses in the source composite video signal.

11. The system of claim 1, wherein the signal processing unit includes: a pre-filter configured to remove high frequency noise from the destination data.

12. A method for processing composite video signals, the method comprising:
generating a line lock clock signal;
generating source data associated with a source composite video signal, the source composite video signal being related to a source clock signal;
storing the source data in a buffer based at least in part on the source clock signal;
providing destination data from the buffer based at least in part on the line lock clock signal;
processing the destination data to extract a synchronization component;
determining a phase error between the synchronization component and the line lock clock signal;
adjusting the line lock clock signal based at least in part on the phase error; and
adjusting the source data based at least in part on the phase error.

13. The method of claim 12, further comprising:
generating a control signal based at least in part on the phase error; and
adjusting the line lock clock signal based at least in part on the control signal.

14. The method of claim 12, further comprising:
generating phase information; and
interpolating the source composite video signal based at least in part on the phase information to generate the source data.

15. The method of claim 14, further comprising:
providing a valid signal;
wherein the source data is stored to the buffer when the valid signal is at a logic high level.

16. The method of claim 15, further comprising:
generating a control signal based at least in part on the phase error; and
adjusting the phase information and the valid signal based at least in part on the control signal.

17. The method of claim 12, further comprising:
adjusting the line lock clock signal to reduce the phase error between the synchronization component and the line lock clock signal.

18. The method of claim 12, wherein the destination data is output from the buffer when the stored source data reaches a threshold.

19. The method of claim 12, wherein the synchronization component corresponds to one or more pulses in the source composite video signal.

20. A system for processing composite video signals, the system comprising:
one or more data processors; and
a computer-readable storage medium encoded with instructions for commanding the data processors to execute operations including:
generating a line lock clock signal;
generating source data associated with a source composite video signal, the source composite video signal being related to a source clock signal;
storing the source data in a buffer based at least in part on the source clock signal;
providing destination data from the buffer based at least in part on the line lock clock signal;
processing the destination data to extract a synchronization component;
determining a phase error between the synchronization component and the line lock clock signal;
adjusting the line lock clock signal based at least in part on the phase error; and
adjusting the source data based at least in part on the phase error.

* * * * *